Aug. 15, 1939.   P. R. CASSIDY   2,169,972
FURNACE
Filed June 4, 1936   4 Sheets-Sheet 1

INVENTOR.
Perry R. Cassidy
BY
ATTORNEY.

Aug. 15, 1939.   P. R. CASSIDY   2,169,972
FURNACE
Filed June 4, 1936   4 Sheets-Sheet 2
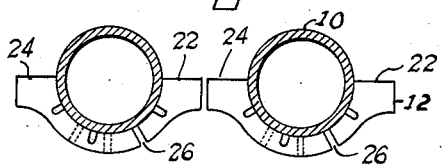
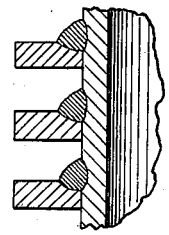
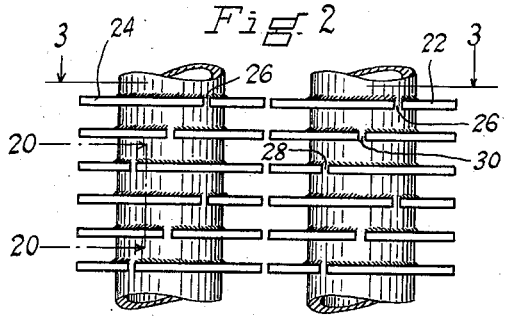
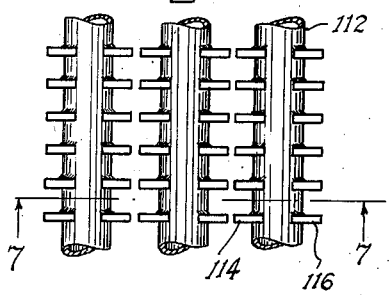
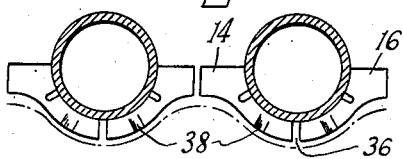
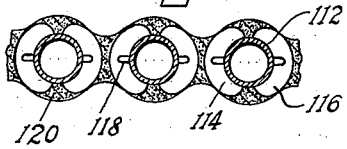
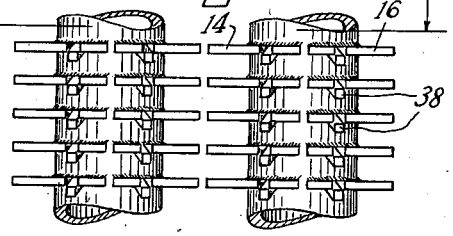
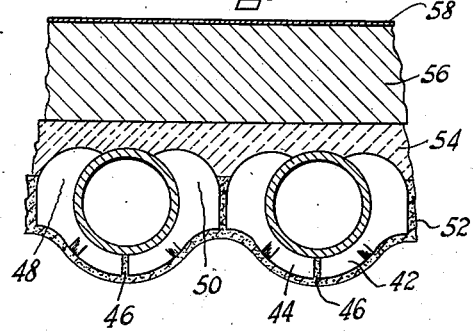
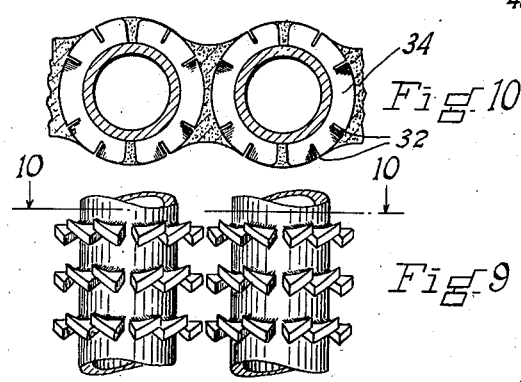
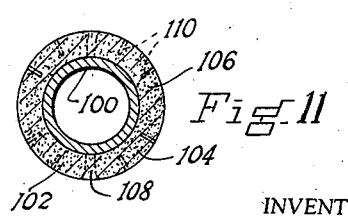
INVENTOR.
Perry R. Cassidy
BY
ATTORNEY.

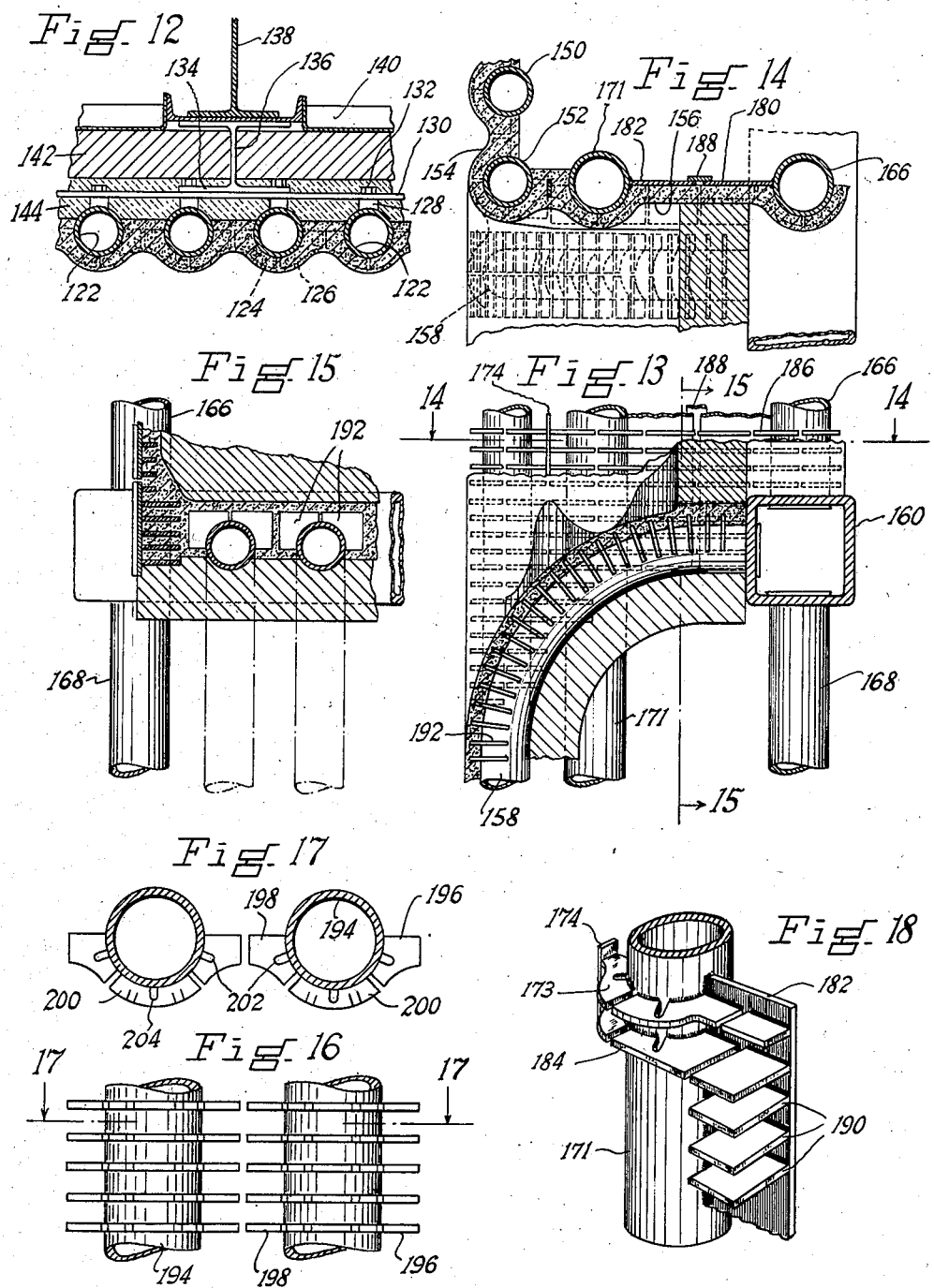

Aug. 15, 1939.　　　P. R. CASSIDY　　　2,169,972
FURNACE
Filed June 4, 1936　　　4 Sheets-Sheet 4

INVENTOR.
Perry R. Cassidy
BY
ATTORNEY.

Patented Aug. 15, 1939

2,169,972

UNITED STATES PATENT OFFICE 2,169,972

FURNACE

Perry R. Cassidy, Short Hills, N. J., assignor to The Babcock & Wilcox Company, Newark, N. J., a corporation of New Jersey Application June 4, 1936, Serial No. 83,444

15 Claims. (Cl. 122—330)

This invention relates to furnace walls provided with conduits through which fluid is circulated to thereby protect the walls from overheating and to effectively utilize the furnace heat, and a general object of the invention is to provide improved constructions of this kind.

More specific objects of the invention are to provide fluid cooled furnace walls characterized by the relative simplicity of their construction, the relatively low cost at which they may be produced, the protection of the tubes against injurious flame impingement and the corroding action of combustion products by covering the tubes with refractory material, and the effective manner in which the conduits reinforce the nonmetallic refractory wall portions.

A further object of the invention is to provide fluid cooled furnace walls having conduits constructed with integral metallic plates contributing to intimate and extended contact between the conduits and the non-metallic refractory portions of the walls, thereby minimizing the number and size of the conduits required to provide an adequate cooling effect.

Another objective is a fluid cooled wall adapted to form a furnace boundary, exposed to heat on one side, and adapted to form a partition wall separating a plurality of furnaces and exposed to heat on both sides. The wall is capable of long continuous service without excessive damage even when slagging solids such as fused coal ash are produced in the operation of the furnace.

Other objects of the invention will appear as the accompanying description proceeds.

The invention will be described with reference to the accompanying drawings, in which:

Fig. 2 is a partial elevation illustrating an embodiment of the invention in which the stud plates are arranged in pairs of unequal plates, with offset stress relieving spaces between the plates of each pair.

Fig. 3 is a horizontal section taken on the line 3—3 of Fig. 2.

Fig. 4 is a partial elevation indicating a wall construction in which the stud plates are deformed at their outer edges to provide refractory anchors.

Fig. 5 is a horizontal section on the line 5—5 of Fig. 4.

Fig. 6 is a partial elevation of the tubes and plates of a partition wall separating two furnaces such as are indicated in Fig. 19.

Fig. 7 is a horizontal section on the line 7—7 of Fig. 6, illustrating also the refractory material which is installed as a plastic, to close the spaces between the tubes and the plates.

Fig. 8 is a horizontal section showing an embodiment in which there is an extended area over which heat is transferred from the plates to the tubes.

Fig. 9 is a partial view of a furnace partition wall, showing the circular plates with their marginal refractory anchors.

Fig. 10 is a horizontal section of the wall illustrated in Fig. 9.

Fig. 11 is a transverse section of a stud plate wall tube which may have the refractory material separately set on the tube at the shop.

Fig. 12 is a partial horizontal section through a furnace wall, showing the external casing secured to the wall tubes with the insulating material interposed.

Fig. 13 is a view in the nature of a vertical section through an inspection door part of the furnace, taken on the line 13—13 of Fig. 1.

Fig. 14 is a view in the nature of a horizontal section on the line 14—14 of Fig. 13.

Fig. 15 is a view in the nature of a vertical section on the line 15—15 of Fig. 13.

Fig. 16 is a partial elevation of an embodiment in which the stud plates are formed with stress relieving slots and refractory anchors.

Fig. 17 is a horizontal section taken of the Fig. 16 embodiment.

Fig. 18 is a perspective view of a portion of the inspection door construction indicated in Fig. 13.

Fig. 20 is a sectional view taken on the line 20—20 of Fig. 2.

Figure 1:
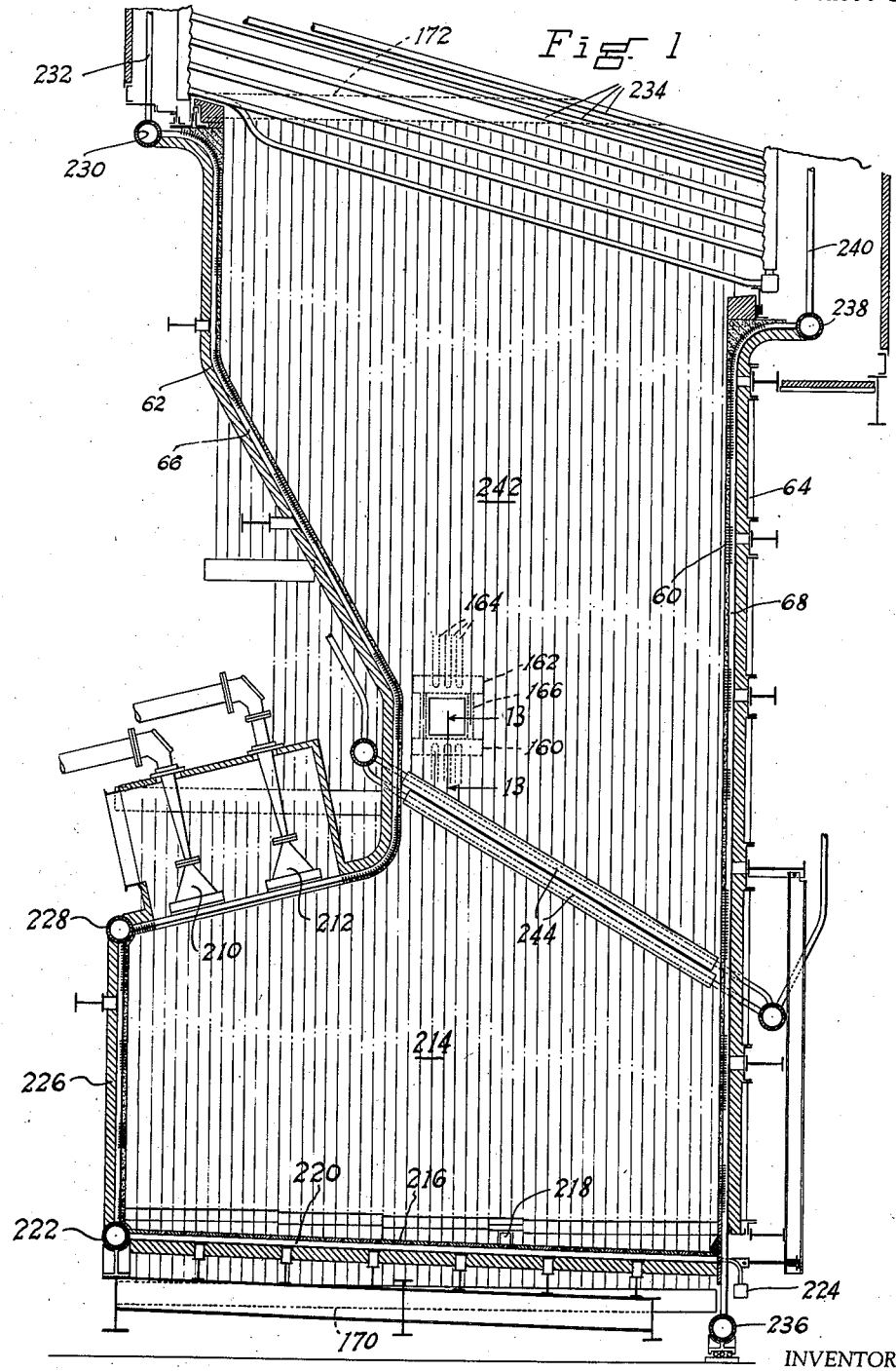
Fig. 1 is a view in the nature of a vertical section of a steam boiler furnace in the construction of which the invention may be applied.

The invention comprehends a type of furnace wall construction comprising certain structural elements, their relationships, and the method of building the wall. A row of parallel and spaced internally cooled tubes, such as the water tubes of a steam boiler, constitutes the foundation of the wall. This provides structural strength, and a means of heat absorption from the wall to limit its rise of temperature when the wall face is exposed to intense furnace heat, the tubes remaining at a substantially constant temperature during normal boiler and furnace operation.

The spaces between the wall tubes are closed by structures including material which adds thermal resistance. When this material covers the tubes or metallic extensions on the tubes, the temperature of the exposed wall face is increased to such a degree that good fuel ignition conditions are promoted, while the wall face is protected against destruction by fusion, fluxing, or slagging.

This is accomplished by welding to the tubes 10 relatively thin plates 12 such as those shown in Figures 2 and 3 of the drawings. These plates are set edgewise and at right angles to each tube. They extend across each tube at intervals along its length, and preferably project into and partway across the inter-tube spaces. The plates are preferably of the same material as the tubes, and they are formed by stamping, punching or shearing them from sheets or strips. They are welded to the tubes in such a manner that a good thermal bond is produced.

Not only must there be a good thermal bond between the plates and the tubes but, the arrangement, dimensions, and spacing of the plates must be co-ordinated if the wall is to endure under such high furnace temperatures as are usually encountered in modern furnaces of the high heat release type. Such temperatures are as high as 3000° F., and it is important that the plates adequately absorb heat from the refractory material around them if the latter is to be protected against the effect of furnace gases at such temperatures. In a typical installation stud plates of the type indicated in Figures 2 and 3 of the drawings are of steel ¼ inch thick and ¾ inch wide directly in front of the tubes. Plates are arranged on 1 inch centers longitudinally of the tubes to which they are welded and the weld fillets behind the plates and the tubes are at least as thick as the plates themselves.

The inner edges of the plates will therefore have approximately the same temperature as the tube metal at the junctions of the plates and the tubes. In order that the plates may be effectively arc-welded to the tubes the plate thickness should be approximately equal to the thickness of the walls of the tubes.

The plates shown in the drawings have curved outer edges, with the edges of their outer marginal portions immediately in front of the tubes and directly toward the combustion chamber, having a curvature which is preferably concentric with the curvature of the tubes. Such construction is indicated in Figures 3, 5 and 17 of the drawings. Beyond their front portions concentric with the tubes, the plates are preferably formed with wings 14 and 16 extending into the intertube spaces, but when the furnace wall is to be subjected on two sides to the heat of furnace gases the wall may be formed with plates which have their outer edges entirely concentric with the tubes as indicated in Figures 7 and 10 of the drawings.

In the wall constructions indicated in Figures 3, 5 and 17, the thermal conditions on opposite sides of the walls are dissimilar, these walls being particularly suitable for the boundary walls of the furnaces where they will be exposed to heat on one side only. In such a case the maximum radial width of the plates is in the spaces between the tubes and the minimum radial width of the plates is toward the face of the furnace wall exposed to heat. This is the position where the intensity of heat is greatest. When such plates are used in walls having the tubes and the plates covered by refractory material, heat is conducted from the furnace face of the wall to the water tubes mainly through the plates, such heat as is received by the refractory material being mainly conducted to the plates. Thus a high temperature furnace wall may be produced by increasing the spacing of the plates, by increasing the radial widths of the plates directly toward the furnace and by covering the outer portions of the plates with a thicker layer of refractory material.

To avoid excessive local stresses in the plates, in the tubes, or in the weld junctions, the circumferential continuity of the plates is interrupted in such a way as not to substantially impair their value as heat conductors. Otherwise such stresses would arise from the operation of arc-welding, or from the differential temperatures of the plates in normal service. This interruption of the circumferential continuity may be accomplished by providing spaced cut-out portions at the inner edges of the plates. Such provisions are illustrated at 20 in Fig. 18. These cut-out portions are preferably of small radial and circumferential width.

Local stresses may also be avoided by providing the plate constructions with full radial width cuts of narrow circumferential width, as indicated in Figs. 3 and 5 of the drawings. In these cases the plates aligned transversely of the tubes may be considered as divided into two parts, such as parts 22 and 24, in Fig. 3, these parts being separated by the full radial width cuts 26. Further injury to the tubes in the welding of such plates thereon is prevented by staggering these radial width cuts on successive plates, longitudinaly of the tubes. This is illustrated in Figs. 2 and 3 in which the full radial width cuts 26 are offset radially with respect to the full radial width of the cuts 28 and 30 in successive plate constructions along the tubes.

Excessive local stresses may also be avoided by the provision of radial slots extending inwardly of the plates. Such a construction is shown in Figs. 9, 10 and 11 wherein the radial slots 32 divide the plates 34 into segments. These segments may be bent as indicated in Fig. 9, in order to accomplish the additional result of increasing the refractory bonding effectiveness of the plates.

The construction illustrated in Figs. 4 and 5 combines both of the above methods of avoiding local stresses. Here, the plate sections 14 and 16 are separated by full radial width cuts 36 and in each of the sections there are radial slots which permit the anchor sections 38 to be bent out of the plane of their sections, as illustrated.

It is to be understood that the different plates or plate sections mentioned as having full radial width cuts therebetween, may be separately formed and welded to the tubes in an arrangement wherein the sections are spaced circumferentially of the tubes and aligned transversely of the tubes. Alternatively, the plates may be formed as complete elements to embrace the tubes, and thereafter, and after they are welded to the tubes, the full radial width cuts may be made. The wall construction indicated in Fig. 8 illustrates another embodiment of the invention which may be so formed. In this embodiment the front portions 42 and 44 of the plate sections are separated by the full radial width cuts 46, and the remaining portions 48 and 50 of the plate sections are increased in area and extended a greater distance toward the cooler sides of the tubes. Thus the refractory material between the plate sections is additionally cooled, and a greater metallic area of the tubes receives heat transmitted to the front plate portions 42 and 44. The refractory material 52 forms a furnace face forwardly of the plate sections, and this material is installed as a plastic over the tubes and between the plate sections. Rearwardly of the tubes there is the insulating material 54 which may be installed as loose material between other heat insulating material 56 and the tubes. This latter material may be in the form of heat insulating blocks held in place by the metallic casing 58. The furnace walls including the other embodiments of tube and plate constructions are intended to be made up of similar elements.

The illustrative walls may be incorporated in the furnace of a steam boiler such as that indicated at 60 in Fig. 1. The walls 62 and 64 of this furnace include wall tubes 66 and 68 which are connected into the boiler circulation. When these walls are constructed according to the above described embodiments of the invention, the walls are protected against overheating, and the heat of the furnace effectively utilized to generate steam.

The illustrative walls are adapted for use as furnace boundary walls exposed to the intense furnace heat on one side only. Such an arrangement is also illustrated in Fig. 1 of the drawings, but the illustrative constructions are also adapted for use in a partition wall dividing two adjacent furnaces and exposed to furnace heat of different intensities on its opposite sides. Such a partition wall construction is indicated at 72, in Fig. 19 of the drawings. Here, the wall separates the furnaces 74 and 76 which may be separately fired by the separate series of burners 78 and 80. These furnaces are shown as a part of the marine boiler including a steam and water drum 82 and water drums 84 and 86. Banks of steam generating tubes 88 and 90 connect the drums 84 and 82, and the bank of tubes 92 connects the drums 86 and 82. Forwardly of the bank of tubes 92 are steam generating tubes 94 which protect the superheater 96 from excessive heat. When the adjacent furnaces of such a steam boiler installation are separated by a partition wall construction in accordance with the teachings of this invention, the wall is capable of long continuous operation under high temperature conditions, and even under slagging furnace conditions, as when the wall is contacted by fused coal ash. It can be constructed with facility and can be easily repaired or modified without removing the supporting tubes from the furnace.

The walls 72 may be made up of refractory covered tubes which are made up in the shops and transported to the job. That is to say, the tubes may have the plate sections welded thereon in the shops and each tube may be encased in refractory material and there subjected to furnace heat so that the refractory material is set and anchored to the tubes and the plate sections. The completed furnace wall units may then be shipped to the job. Such a tubular unit is indicated in Fig. 11 of the drawings. Here, the tube 100 and its plate sections 102 and 104 are encased in a hollow refractory cylinder 106, adjacent sections being separated by full radial width cuts 108. The sections are also provided with radial slots 110 to avoid excessive local stresses. When such tubes are set up in a boiler construction similar to that shown in Fig. 19, the constructions are preferably located in compact, or in closely spaced arrangement, so that a furnace dividing wall is formed.

Figure 19:
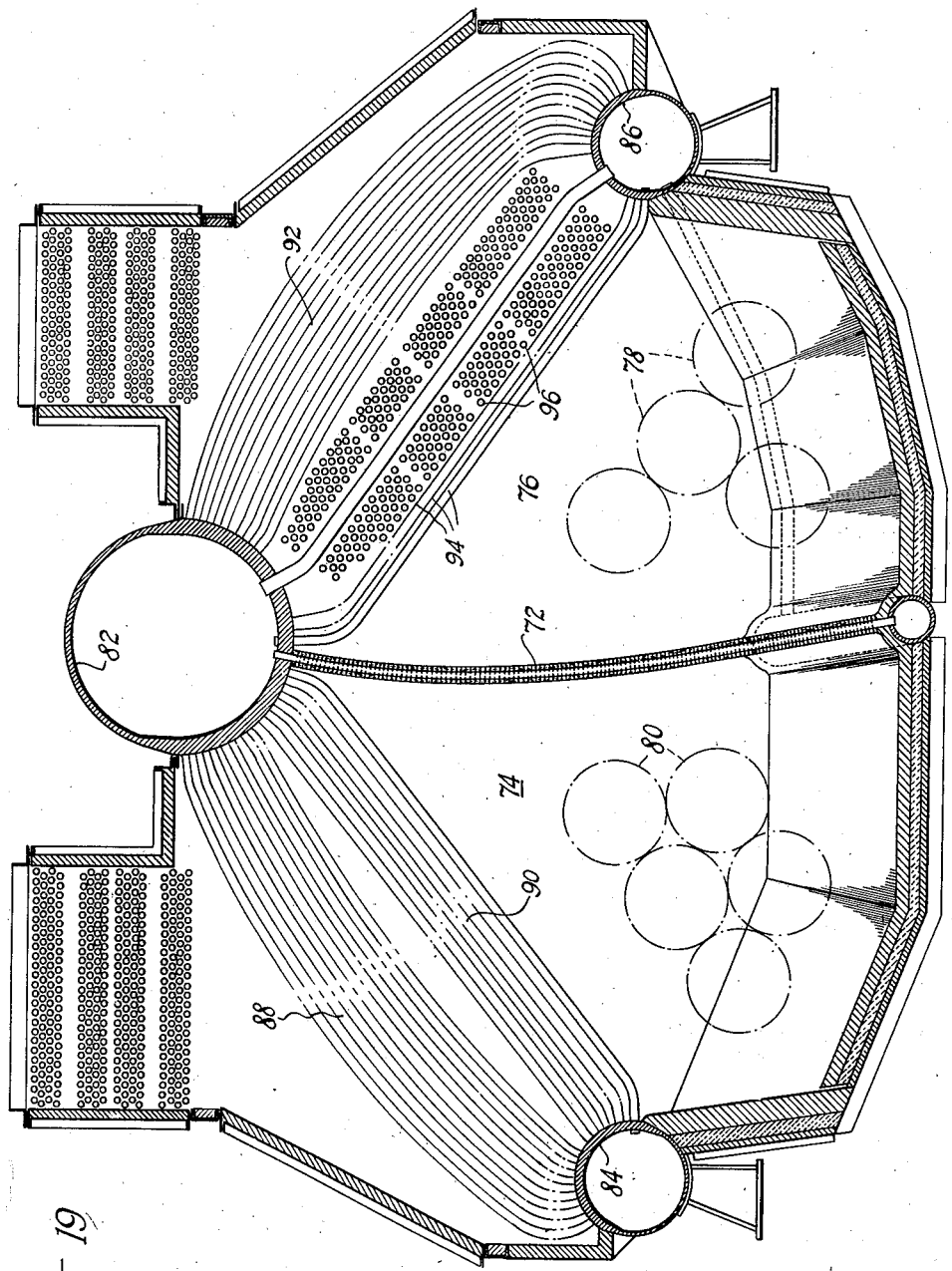
Fig. 19 is a view in the nature of a vertical section, indicating a multiple furnace boiler in which the furnaces may be separated by such a stud plate partition wall as that shown in Figures 7, 9 or 11.

Such a furnace partition wall as that shown at 72 in Fig. 19 of the drawings may also be constructed in accordance with the disclosure of Fig. 7. Here, the tubes 112 are arranged in a row and they are provided on their facing sides with plate sections 114 and 116, welded to the tubes and formed with radial slots 118 extending outwardly from the inner edges thereof. After these plate sections are welded on the tubes, and after the tubes are set up in their wall forming positions, the tubes and the plate sections are covered by refractory material 120 which forms a furnace face of each of the divided furnaces.

In the wall construction indicated in Fig. 12 of the drawings, the tubes 122 are provided on their front sides with refractory covered plate sections 124 and 126 arranged similarly to the manner above described and similarly welded to the tubes. Bosses or studs 128 are welded to the cooler sides of the tubes for use in securing the tubes to a tie bar 130. This tie bar contacts with the bosses 128 and is secured thereto by stud bolts 132 extending through the tie bar and screw-threaded into the bosses. At intervals along the wall some of the stud bolts 132 also extend through the flanges 134 of H-beam sections 136. These sections are secured to upright buckstays 138. Fig. 12 also shows exterior casing sections 140 which are secured to the buckstays externally of the insulating layers 142 and 144. The construction indicated in this figure is illustrative of a wall construction in which any one of the above described modifications may be used.

Fig. 13 shows a section of an access door construction taken on the section line 13—13 of Fig. 1. This construction is also illustrated by the associated Figures 14 and 15. In this construction the tubes 150 are aligned in the normal wall forming arrangement of the main portions of the wall tubes, the tube 152 being positioned at a corner of the face 154 of the main furnace wall and the face 156 of the access door opening. There is a similar arrangement of the tubes at the opposite side of this opening. Intermediate wall tubes 158 are curved outwardly as shown in Fig. 13 to define the lower surface of the access door opening. Their outer ends are expanded into a header 160 positioned below the door, and above the door is a similar header 162, and the wall tubes 164 positioned above the access door, lead downwardly thereto and are bent outwardly in a manner similar to the manner in which the tubes 158 are bent. These tubes 164 are expanded into the header 162.

Circulation across the access door opening may be completed by tubes 166 which directly connect the upper and lower headers 160 and 162. Communicating with the lower header 160 and leading downward therefrom are recirculator tubes 168, preferably communicating at their lower ends with the wall tube headers 170 (see Fig. 1).

The tubes 150 may be connected into the boiler circulation in any appropriate manner. At their lower ends they may be connected to the headers 170 in order that they may be operated as recirculating tubes and at their upper ends they may be connected to the upper wall headers 172. On the sides of these tubes facing the adjacent tubes 152 are located short plate sections 173 welded to the tubes. The outer ends of these sections are spaced slightly from similar sections extending from the tubes 152, and between the ends of these sections short upright bars 174 are positioned. The plate sections 173, and the similar sections extending from the tubes 152 are welded to the bars 174 and the tubes are thereby prevented from spreading apart. On the opposite sides of the tubes 171 the spaces between these tubes and the tubes 166 are closed by plate sections 180 and 182. The latter are made rigid with the tubes 171 by reason of the fact that they are welded to the plate sections 184 which, in turn, are welded to the tubes 171. Fig. 18 also shows this arrangement of elements. The sections 180 are similarly rigid with the plate sections 186 secured to the tubes 166, and the joints between the sections 180 and 182 are closed by strips 188. Additionally, inwardly extending plates 190 are welded to the section 182 and similar plates are welded to the section 180 to form continuations of the stud plates secured to the tubes and to support the refractory material which is thereafter installed as a plastic over the tubes and over the stud plates.

The curved sections of the tubes 158, as shown in Fig. 13, and the similarly curved sections of tubes 164 are provided with the stud plates 192 having straight outer edges as shown in Fig. 15.

In the wall construction indicated in Figs. 16 and 17 of the drawings, the tubes 194 are provided across their furnace faces with plate sections arranged circumferentially of the tubes in groups of three. Thus the wing sections 196 and 198 are separated by intermediate sections 200 which are transversely spaced at their ends from the wing sections. The latter are provided with radial slots 202, and similar slots 204 are provided in the intermediate sections 200 for avoiding local stresses in the manufacture of the wall units, or in the operation of the completed wall.

The boiler furnace indicated in Fig. 1 is intended to use pulverized coal as fuel and is fired by the burners 210 and 212. Flames are thus projected downwardly into a primary combustion chamber 214 in which intense combustion takes place. All sides of this combustion chamber are cooled by water tubes and the floor 216 of this chamber is intended to maintain a slag pool from which the slag may be tapped periodically through a slag tap opening 218. This floor is cooled by tubes 220 communicating with the headers 222 and 224. The latter are connected into the boiler circulation in any suitable manner, the headers 222 being shown as communicating with wall tubes 226 which, in turn, communicate with the header 228 and the wall tubes 66. The latter are connected to the upper wall header 230 from which uptake tubes 232 may connect with a steam and water drum located above the bank of steam generating tubes 234. At the opposite side of the furnace, the wall tubes 68 communicate with the lower wall header 236 and the upper wall header 238. The latter may be connected to the same steam and water drum by uptake tubes 240.

The primary combustion chamber 214 is separated from the secondary combustion chamber 242 by refractory covered slag screen tubes 244, and slag particles carried in suspension by the furnace gases are deposited on the refractory covering of the slag screen tubes 244 before they pass into the secondary combustion chamber 242. The slag screen tubes may be constructed in accordance with the manufacture described with reference to the tubes shown in Fig. 11 of the drawings.

I claim:

1. In combination with a steam boiler, a furnace wall including spaced tubes exposed externally to high temperatures and carrying a fluid to be heated, said tubes being of small diameter compared to their lengths and of small wall thickness compared to their diameter, a plurality of heat conducting extension members in the form of transverse plates welded to the sides of the tubes at spaced positions and adapted to transmit heat to the tubes and hence to the liquid within, a plurality of said plates being aligned transversely of each tube axis at each of a multiplicity of spaced positions on the sides of the tubes presented toward the interior of the furnace, and a substantially monolithic body of refractory material installed as a plastic between the tubes and their extensions to form the furnace face.

2. In a furnace wall, spaced tubes, metallic plates welded to the tubes and arranged transversely thereof over the sides of the tubes nearer the interior of the furnace, and ceramic refractory material installed as a plastic between the tubes and the plates to present a furnace face, the plates having their parts directly in front of the tubes concentric therewith while the portions of the plates between adjacent tubes are of considerably greater width.

3. In a furnace wall, spaced wall cooling tubes connected into a fluid circulation, transverse metallic plates welded to the furnace sides of the tubes, and refractory material between the tubes and the plates, the area of the plates within the inter-tube spaces and outwardly of the plane of the high temperature faces of the tubes being much greater than their area forwardly of said plane.

4. In fluid heat exchange apparatus, a furnace wall including spaced tubes exposed externally to high temperatures and carrying a fluid to be heated, said tubes being of small diameter compared to their lengths and of small wall thickness compared to their diameter, and a plurality of heat conducting extension members in the form of transverse plates welded to the outside of the tube at spaced positions and adapted to transmit heat to the tube and hence to the liquid within, a plurality of said plates being aligned normally of the tube axes at spaced positions on the sides of the tubes presented toward the interior of the furnace, the plates having their plate characteristics continued right up to welds which unite them with the tubes and adjacent transversely aligned plates being circumferentially spaced apart a distance less than the circumferential lengths of the welds.

5. In a furnace wall construction, spaced wall cooling tubes connected into a fluid circulation, parallel sets of spaced metallic plate members welded to each tube over its furnace side and extending into the spaces between the tubes, the members of said sets being so formed and arranged that there are spaces between them extending radially relative to the tubes and their axes, and ceramic refractory material installed as a plastic between the tubes and said plate members to form a furnace wall face, said sets extending transversely of the axes of the tubes with the radially extending spaces in adjoining sets on each tube staggered relative to longitudinal axis of the tubes.

6. In fluid heat exchange apparatus, two furnaces, and a plate tube wall separating the furnaces, said wall including spaced upright tubes connected into the fluid circulation of the apparatus, parallel metallic plates welded to the tubes transversely of the tube axes, and ceramic refractory material closing the spaces between the tubes and installed as a plastic between the plates.

7. In a boiler furnace wall, spaced wall tubes, metallic plates arranged transversely of the longitudinal axes of the tubes and welded thereto so as to extend from the tubes toward the interior of the furnace and into the spaces between the tubes, metallic members extending parallel to the tubes and positioned between them across the outer edges of said plates, highly refractory ceramic material installed as a plastic between the tubes and the plates so as to present a furnace face, other refractory material covering said metallic members and the tubes on their outer sides, a furnace casing, insulating material between the casing and said other refractory material, and extending through the insulation material and means tying the casing to the tubes.

8. In a fluid cooled furnace wall, a row of spaced wall cooling tubes with transversely disposed plate members welded to the tubes and extending into the inter-tube spaces, the outer edges of said members being interrupted by slots, and non-metallic refractory material installed as a plastic over the tubes and between said members, said refractory material being anchored to the plate members along their interrupted edges.

9. In a wall dividing two combustion chambers, spaced wall cooling tubes connected into a fluid circulation, arcuate metallic plates extending through the wall and welded to the tubes across the opposing faces of adjacent tubes, and non-metallic refractory material installed as a plastic around the tubes to close the spaces between them.

10. A furnace chamber wall comprising a row of spaced wall cooling tubes connected into a fluid circulation and having transverse metallic plates extending toward the high temperature side of the wall and backwardly from the furnace sides of the tubes into the inter-tube spaces, and non-metallic refractory material installed as a plastic between the tubes and the plates to close the spacing therebetween, the plates being disposed in parallelism with adjacent plates formed with radially disposed stress-relieving slots which are offset in adjacent plates relative to the longitudinal axes of the tubes.

11. In a furnace wall, spaced tubes, transverse metallic plates welded to the tubes and having bent up portions along their outer margins, and refractory material installed as a plastic over the tubes and anchored by said bent-up portions.

12. A fluid cooled furnace wall comprising a row of spaced wall cooling tubes with transversely disposed ribs welded to the tubes and projecting from them at the furnace side of the wall, non-metallic refractory material installed as a plastic between the ribs and the tubes to close the spaces therebetween and form a furnace face, and metallic means connecting the adjacent ends of ribs extending from adjacent tubes into the inter-tube spaces.

13. A furnace chamber wall comprising a row of spaced wall cooling tubes connected into fluid circulation and having transverse metallic plates extending toward the high temperature side of the wall, and non-metallic refractory material installed as a plastic between the tubes and the plates to close the spacing therebetween, the plates being disposed in parallelism and formed with radially disposed stress-relieving slots.

14. A fluid cooled furnace wall comprising a row of spaced wall cooling tubes with transversely disposed metallic ribs welded to the tubes and projecting from them at the furnace side of the wall, non-metallic refractory material installed as a plastic between the ribs and the tubes to close the spaces therebetween and form a furnace face, a metallic casing, heat insulating material disposed between the casing and the tubes, means for tying the casing to the tubes, and metallic plates separating said refractory material from the insulating material, said plates extending across the cooled edges of the ribs and being welded to the ribs.

15. A furnace chamber wall comprising a row of spaced wall cooling tubes connected into a fluid circulation and having transverse metallic plates extending toward the high temperature side of the wall, and non-metallic refractory material installed as a plastic between the tubes and the plates to close the spaces therebetween, the plates being disposed in parallelism with adjacent plates formed with radially disposed stress-relieving slots which are offset in adjacent plates relative to the longitudinal axes of the tubes.

PERRY R. CASSIDY.